(12) United States Patent
Tonegawa

(10) Patent No.: US 10,728,402 B2
(45) Date of Patent: Jul. 28, 2020

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Nobuyuki Tonegawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/968,553

(22) Filed: Dec. 14, 2015

(65) Prior Publication Data

US 2016/0191724 A1 Jun. 30, 2016

(30) Foreign Application Priority Data

Dec. 24, 2014 (JP) ................. 2014-261007

(51) Int. Cl.
*G06F 15/00* (2006.01)
*H04N 1/00* (2006.01)
*H04N 1/41* (2006.01)

(52) U.S. Cl.
CPC ..... *H04N 1/00212* (2013.01); *H04N 1/00225* (2013.01); *H04N 1/00307* (2013.01); *H04N 1/41* (2013.01); *H04N 1/0023* (2013.01); *H04N 2201/0094* (2013.01)

(58) Field of Classification Search
CPC ........... H04N 1/00307; H04N 1/00212; H04N 1/00225; H04N 1/0023; H04N 1/41; H04N 2201/0094
USPC ....................................................... 358/1.15
See application file for complete search history.

(56) References Cited

U.S. PATENT DOCUMENTS

| | | | |
|---|---|---|---|
| 2004/0196506 A1* | 10/2004 | Izumi | H04N 1/00209 358/402 |
| 2008/0010175 A1* | 1/2008 | Hagiwara | G03G 21/02 705/30 |
| 2008/0033973 A1 | 2/2008 | Tsutsumi | |
| 2009/0177653 A1 | 7/2009 | Hirabayashi | |
| 2012/0162679 A1* | 6/2012 | Okajima | G06F 3/121 358/1.13 |
| 2012/0162711 A1 | 6/2012 | Shibao | |
| 2012/0212787 A1* | 8/2012 | Hasegawa | H04N 1/40068 358/447 |
| 2012/0250100 A1 | 10/2012 | Kuraya | |
| 2013/0155457 A1* | 6/2013 | Miura | G06F 3/1296 358/1.15 |
| 2016/0014296 A1* | 1/2016 | Saka | H04N 1/642 358/3.24 |

FOREIGN PATENT DOCUMENTS

| | | | |
|---|---|---|---|
| JP | 2002-281220 A | 9/2002 | |
| JP | 2006-086810 A | 3/2006 | |

(Continued)

OTHER PUBLICATIONS

PWG 5100.17—IPP Scan Service; The Printer Working Group; Sep. 18, 2014; pp. 1-51.

*Primary Examiner* — Mark R Milia
(74) *Attorney, Agent, or Firm* — Canon U.S.A., Inc. IP Division

(57) ABSTRACT

A high-compression file format can be designated even in a case where an external device and an image communication apparatus communicate with each other according to a set communication protocol.

6 Claims, 10 Drawing Sheets

(56) References Cited

FOREIGN PATENT DOCUMENTS

| JP | 2012-138796 A | 7/2012 |
| JP | 2012-212963 A | 11/2012 |
| JP | 2013121053 A | 6/2013 |
| JP | 2014138358 A | 7/2014 |

* cited by examiner

SHEET FORMS

SHEET FORMS ARE ROUGHLY DIVIDED INTO TWO TYPES, CUT SHEETS AND ROLL SHEETS, AND 8 OUT OF ALL 93 MODELS ARE COMPATIBLE WITH ROLL SHEETS. ONLY ONE OF THE MODELS COMPATIBLE WITH ROLL SHEETS IS COMPATIBLE WITH BOTH CUT SHEETS AND ROLL SHEETS.

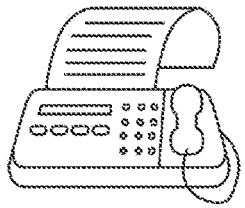

SHEET FORMS

SHEET FORMS ARE ROUGHLY DIVIDED INTO TWO TYPES, CUT SHEETS AND ROLL SHEETS, AND 8 OUT OF ALL 93 MODELS ARE COMPATIBLE WITH ROLL SHEETS. ONLY ONE OF THE MODELS COMPATIBLE WITH ROLL SHEETS IS COMPATIBLE WITH BOTH CUT SHEETS AND ROLL SHEETS.

300dpi MMR COMPRESSION

212

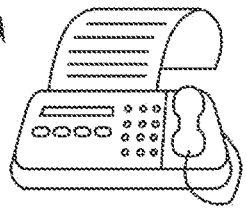

150dpi JPEG COMPRESSION

IMAGE PROCESSING APPARATUS, METHOD OF CONTROLLING IMAGE PROCESSING APPARATUS, AND STORAGE MEDIUM

BACKGROUND OF THE INVENTION

Field of the Invention

The present invention relates to image processing apparatuses, methods of controlling an image processing apparatus, and storage mediums.

Description of the Related Art

Conventionally, there has been a pull scan function of reading an image with a scanner of a multi-function peripheral (MFP) and transmitting the read image to a personal computer (PC) (refer to Japanese Patent Application Laid-Open No. 2002-281220).

Further, there has been a conventional technique for the Joint Photographic Experts Group (JPEG) compression of a scanned color image and converting the image into a portable document format (PDF) file (hereinafter, "normal PDF file").

A normal PDF file has a large data size and therefore has the disadvantage that an electronic mail cannot be used to transmit a file including a plurality of pages.

To overcome the disadvantage, there has been a high-compression PDF the data size for which is decreased by executing image area separation on an image in a page to separate the image into a text section and an image section, binarizing an image in the text section and executing modified modified relative element address designate (MMR) compression on the binarized image, and reducing the resolution of the image section and executing Joint Photographic Experts Group (JPEG) compression on the image section.

According to the conventional technique for the image area separation for a high-compression PDF, depending on the image, a character may be recognized as an image and an image may be recognized as a character. This causes a problem of strangeness of the image.

Thus, users generally selects a normal PDF or a high-compression PDF in each case.

Meanwhile, the Internet Printing Protocol (IPP) is established by the Printing Working Group (PWG), which is a section of the Institute of Electrical and Electronics Engineers (IEEE), which establishes standards for the fields of communications, electronics, and information engineering.

According to the protocol, there is a pull scan function of reading an image with a scanner of a MFP in accordance with a scan instruction from a PC and transmitting the read image to the PC. Further, there is a PDF file (hereinafter, "normal PDF file") generated by executing JPEG compression on a scanned color image and converting the image into an image in PDF file format.

However, depending on the communication protocol, there arises a problem that all PDF files become application/pdf and a high-compression PDF cannot be designated.

SUMMARY OF THE INVENTION

According to an aspect of the present invention, an image processing apparatus includes a reading unit configured to read a document, a receiving unit configured to receive a document reading request from an external device, a control unit configured to control the reading unit to read the document in accordance with the document reading request received by the receiving unit, a generation unit configured to generate a file in high-compression file format based on an image of the document read by the reading unit, and a transmission unit configured to transmit to the external device the file generated by the generation unit.

Further features of the present invention will become apparent from the following description of exemplary embodiments with reference to the attached drawings.

BRIEF DESCRIPTION OF THE DRAWINGS

FIGS. 4A and 4B illustrate image area separation.

DESCRIPTION OF THE EMBODIMENTS

Various exemplary embodiments of the invention will be described below with reference to the drawings.

Figure 1:
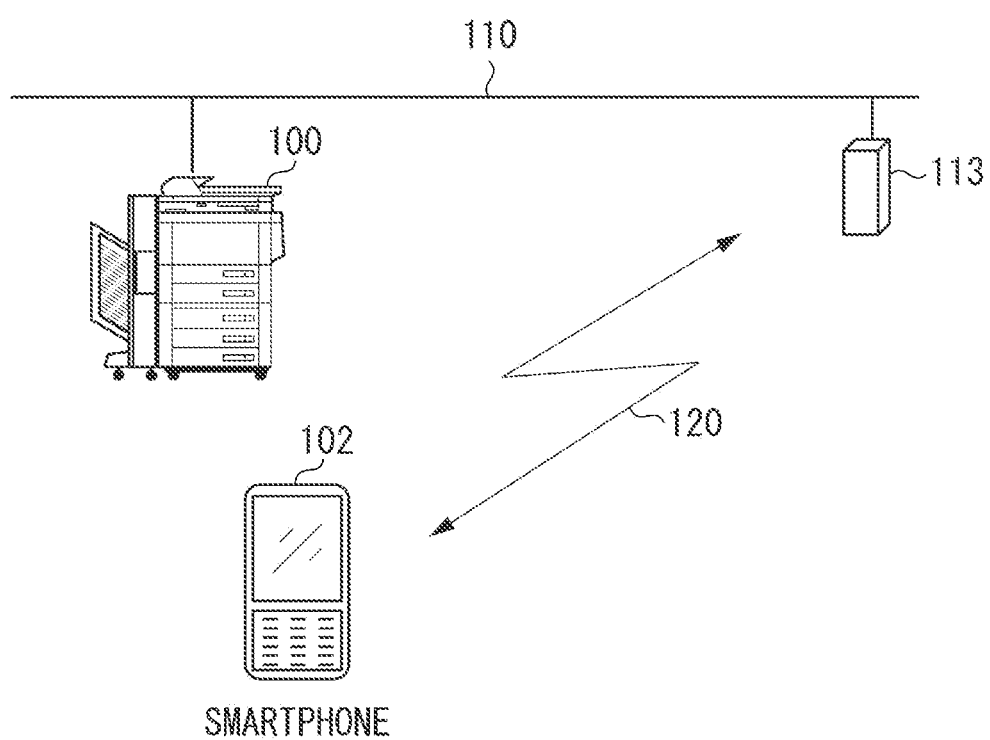
FIG. 1 illustrates an example of a system configuration of an image communication system.

The following describes a first exemplary embodiment. FIG. 1 illustrates an example of a system configuration of an image communication system.

A multi-function peripheral (MFP) 100 is an electrophotographic MFP including a copy function, a facsimile function, a printer function, etc. The MFP 100 is connected to a network 110.

The MFP 100 includes a pull scan function of reading a document placed on a scanner in accordance with a scan instruction from a smartphone 102, etc. and transmitting a file in designated file format to the smartphone 102, etc.

The network 110 is connected to a Wi-Fi router 113 and also to the Internet 112.

The Wi-Fi router 113 is a wireless local area network (LAN) allowing devices to connect to one another by use of the Institute of Electrical and Electronics Engineers (IEEE) 802.11 standards, which are international standards.

Radio waves of Wi-Fi are weak, so Wi-Fi can be used only within a particular area of several meters to several tens of meters.

The smartphone 102 is a mobile phone, etc. including an Internet browse function.

The smartphone 102 also includes the Wi-Fi function and can communicate with a device connected to the network 110 via a wireless LAN 120 when the smartphone 102 is within a Wi-Fi connection area.

The smartphone 102 also supports a digital mobile phone communication method of a third generation (3G) mobile communication system complying with International Mobile Telecommunication 2000 (IMT-2000) standards defined by the International Telecommunication Union (ITU). Thus, the smartphone 102 can also connect to the Internet via a wireless network of a mobile phone company.

Figure 2:
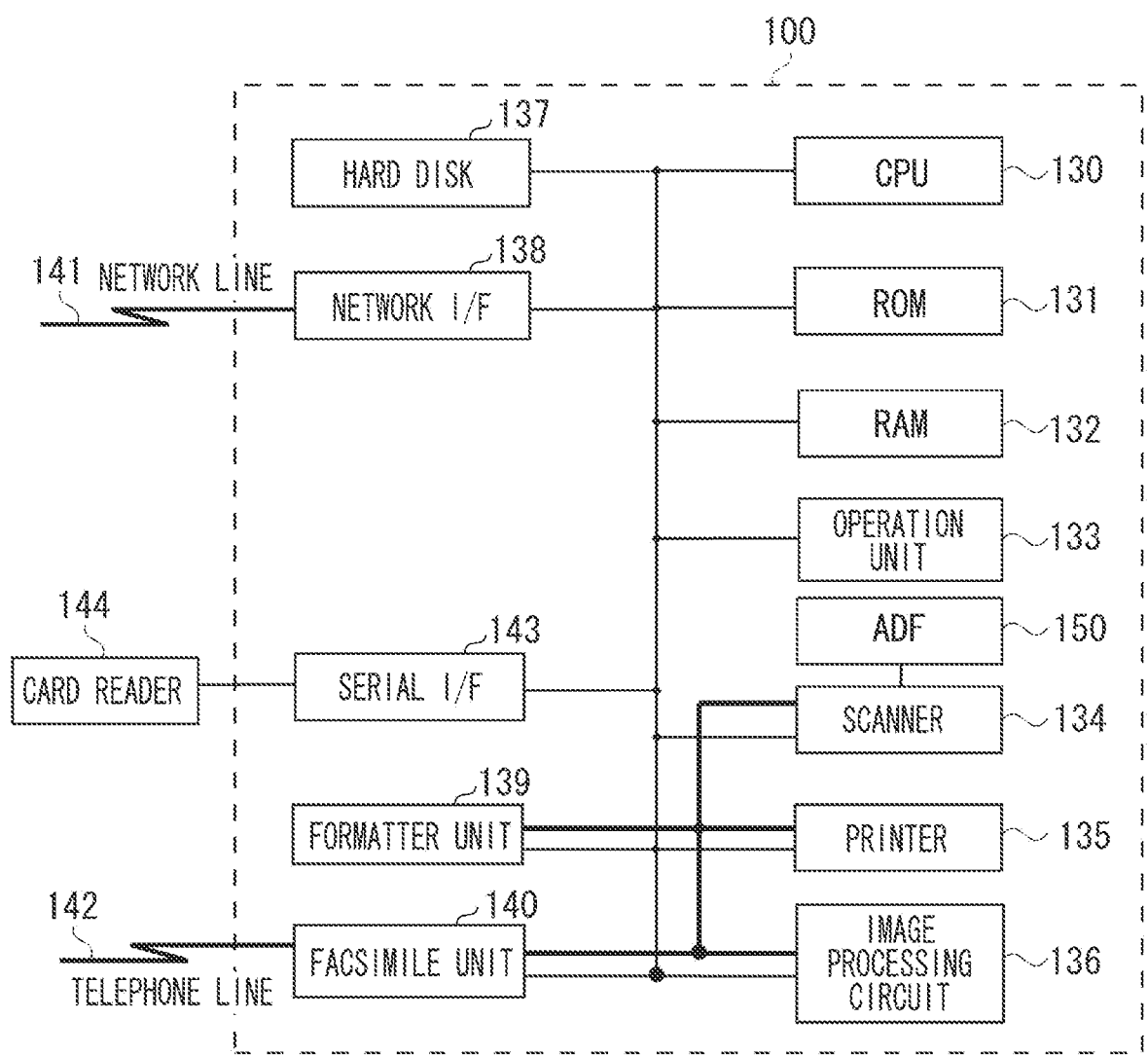
FIG. 2 illustrates an example of a hardware configuration of a multi-function peripheral (MFP), etc.

FIG. 2 illustrates an example of a hardware configuration of the MFP 100, etc.

In FIG. 2, a central processing unit (CPU) 130 is a control circuit configured to control an entire system by use of a program stored in a read-only memory (ROM) 131 and a memory of a random access memory (RAM) 132.

An operation unit 133 includes a liquid crystal display (LCD) panel and hard keys such as a start key, a numeric keypad, etc. The operation unit 133 is a circuit configured to display buttons on the LCD by use of software and detect a touch of a finger of a user on the buttons to smoothly execute the user operation.

A scanner 134 reads an image on a document to generate image data. A printer 135 prints on a recording medium an image based on the image data.

An image processing circuit 136 includes a large-capacity image memory, an image rotation circuit, a resolution magnification circuit, an encoding/decoding circuit for modified Huffman (MH), modified relative element address designate (MR), modified modified relative element address designate (MMR), Joint Bi-level Image Experts Group (JBIG), Joint Photographic Experts Group (JPEG), etc. The image processing circuit 136 can also execute various types of image processing such as shading, trimming, masking, etc.

A hard disk 137 is a large-capacity recording medium connected via an interface (I/F) according to small computer system interface (SCSI), integrated drive electronics (IDE), etc.

A network I/F 138 is a circuit for connecting the MFP 100 to a local area network line complying with the standard represented by 10BASE-T or 100BASE-T or a network line complying with token ring, etc.

A formatter unit 139 is a rendering circuit configured to generate an image to be printed by the printer 135.

In a case where a page description language (PDL) data is received from a personal computer (PC) via the network I/F 138, image data is generated based on the received PDL data.

Then, image processing is performed on the generated image data at the image processing circuit 136, and the image data is printed by the printer 135.

The scanner 134, the printer 135, the image processing circuit 136, and the formatter unit 139 are connected to one another via a high-speed video bus different from a CPU bus from the CPU 130 to transfer image data at high speed.

The scanner 134 includes an automatic document feeding apparatus (ADF) 150. When a plurality of documents is set on the ADF 150, the ADF 150 operates to feed the documents to the scanner 134. When the documents are read by the scanner 134, the ADF 150 operates to discharge the documents.

The foregoing operations are repeated until there is no more document so that the scanner 134 can read all the documents placed on the ADF 150.

The MFP 100 operates to perform at the image processing circuit 136 image processing on the image data read by the scanner 134 and print the read image by the printer 135, whereby a copy function is realized.

A facsimile unit 140 controls facsimile communication with an external device on a telephone line 142.

Specifically, the MFP 100 performs at the image processing circuit 136 image processing on image data read by the scanner 134 and transmits the image data to the external device via the telephone line 142, or the MFP 100 receives data from the external device, performs image processing at the image processing circuit 136, and prints the data at the printer 135.

Further, the MFP 100 includes a SEND function.

The SEND function generates at the image processing circuit 136 an image in JPEG format, PDF, tagged image file format (TIFF), or the like, based on the image data read by the scanner 134.

The SEND function transmits the generated image from the network I/F 138 according to a communication protocol such as simple mail transfer protocol (SMTP), file transfer protocol (FTP), server message block (SMB), etc.

The SEND function is categorized into file transmission, electronic mail transmission, Internet facsimile (IFAX) transmission, and facsimile transmission.

The electronic mail transmission refers to the function of transmitting an image file in JPEG format, PDF, TIFF or the like according to the SMTP protocol.

The file transmission refers to the function of transmission according to a transmission protocol such as FTP, SMB, or Web-based Distributed Authoring and Versioning (WebDAV).

The IFAX transmission realizes a facsimile function by transmitting and receiving an image file attached to an electronic mail between devices of the same type complying with the Request for Comments (RFC) 2305.

In the IFAX transmission, a TIFF file defined by RFC 3949 is generated at the image processing circuit 136 based on image data read by the scanner 134 and then transmitted according to the SMTP protocol.

The electronic mail is received to receive the TIFF file by use of the SMTP or Post Office Protocol 3 (POP5) function, and the TIFF file is changed into an internal file format image by the image processing circuit 136 and then printed by the printer 135.

In the FAX transmission, the MFP 100 is connected to the telephone line 142 by use of the facsimile unit 140 and performs G3 facsimile transmission.

A serial I/F 143 is a serial I/F complying with the Recommended Standard 232c (RS-232C), or the like. The serial I/F 143 is an interface for connecting an external serial device to the MFP 100.

A card reader 144 is connected to the serial I/F 143 to read information recorded in an integrated circuit (IC) card.

Each user to use the MFP 100 is provided with an IC card. The card reader 144 reads a card identity (ID) recorded in the card to identify the user that is the owner of the card.

The CPU 130 executes processing according to a program stored in the ROM 131 or the hard disk 137 to realize the functions of the MFP 100, processing of the MFP 100 in a sequence diagram, and processing in a flow chart, which will be described below.

The smartphone 102 also includes at least a CPU and a memory as a hardware configuration. The CPU of the smartphone 102 executes processing based on a program stored in the memory of the smartphone 102 to realize functions of the smartphone 102, processing of the smartphone 102 in a sequence diagram, etc., which will be described below.

Figure 3:
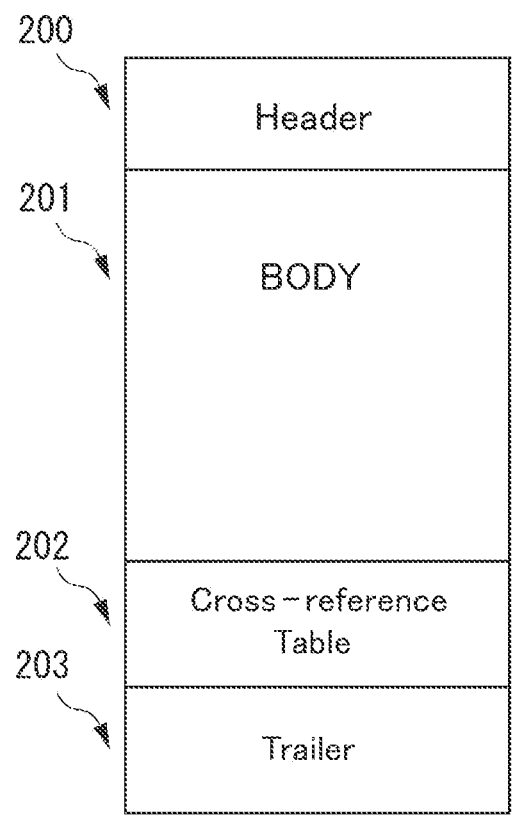
FIG. 3 illustrates an internal configuration of a portable document format (PDF) file relating to a scanner function and a SEND function of an MFP.

FIG. 3 illustrates an internal configuration of a PDF file relating to the scanner function and the SEND function of the MFP 100.

A header 200 exists at the head of the file. Information indicating that the file is a PDF file is described in the header 200.

A body 201 includes image information and text information about the PDF, and a cross-reference table 202 includes information about the position of an image, etc.

FIG. 4A illustrates a document to be scanned.

As illustrated in FIG. 4A, an image including a combination of a character, a picture, a figure, etc. in a single page is frequently used in an office.

In a case of transmitting a normal PDF file, a packet JPEG image 210 with a resolution of 300 dpi that is read by the scanner 134 is decompressed by the image processing circuit 136 and the entire image is JPEG compressed.

The JPEG image is arranged in the body 201 in FIG. 3 to generate PDF data. In a case of transmitting high-compression PDF data, a text section 211 and an image section 212 are separated by image area separation at the image processing circuit 136 as illustrated in FIG. 4B.

The image of the text section 211 is binarized and MMR compressed by the image processing circuit 136.

The resolution of the image section 212 is decreased by half to 150 dpi and JPEG compressed by the image processing circuit 136 to decrease the data size.

Data of the text section 211 and the image section 212 is stored in the body 201 of the PDF file, and information about the positions of the text section 211 and the image section 212 is recorded in the cross-reference table 202, whereby a high-compression PDF file is generated.

Figure 5:
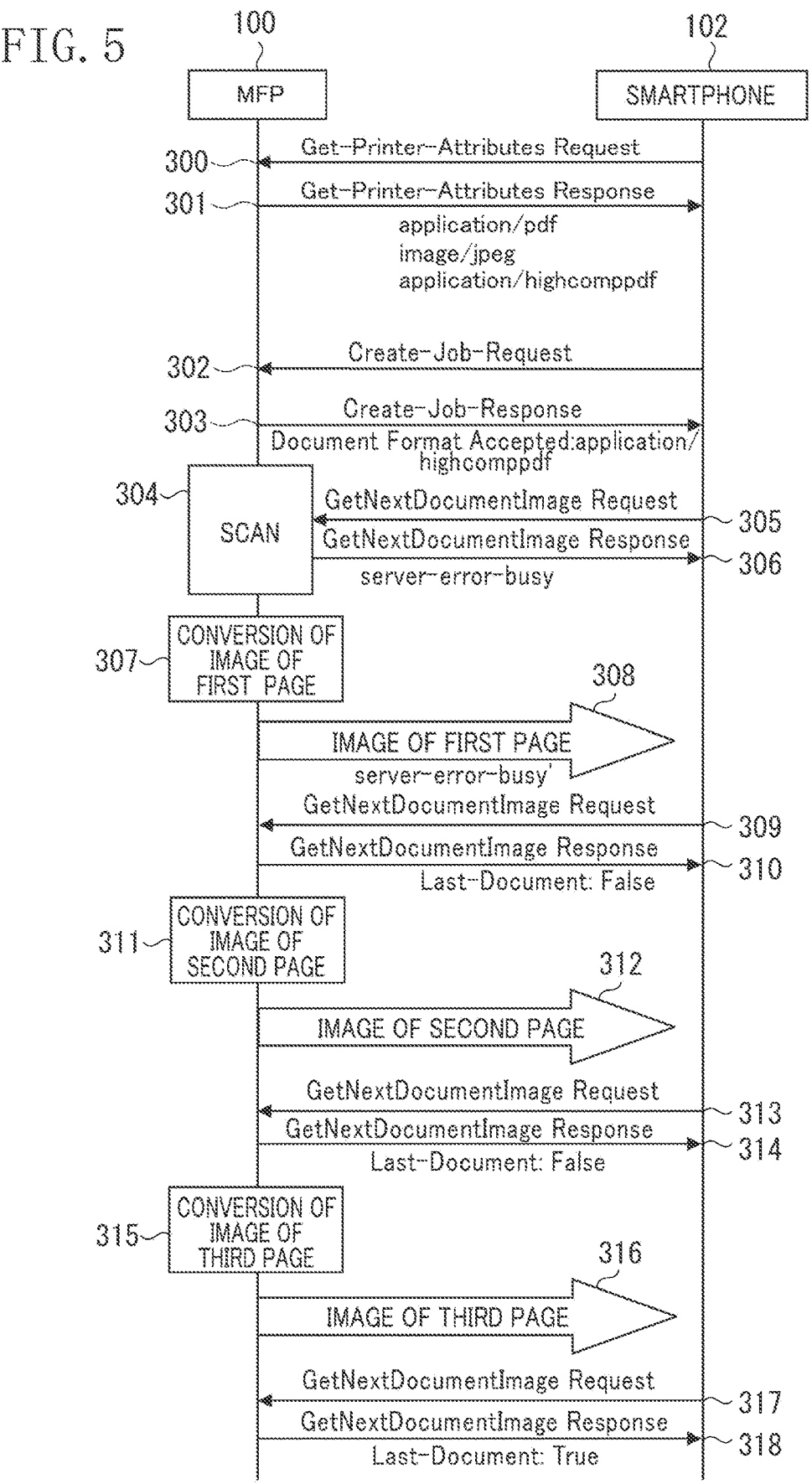
FIG. 5 is a sequence diagram illustrating a pull scan function of a smartphone and an MFP.

FIG. 5 is a sequence diagram illustrating a pull scan function of the smartphone 102 and the MFP 100. FIG. 5 illustrates as an example a case where three pages are scanned.

The user sets documents to be scanned onto the ADF 150 of the MFP 100 and operates the smartphone 102 to give an instruction to start a scan.

First, a Get-Printer-Attributes Request 300 is transmitted from the smartphone 102 to the MFP 100 to inquire about a file format that can be handled by the MFP 100.

In response to the inquiry, the MFP 100 returns a Get-Printer-Attributes Response 301. The MFP 100 sets, as file formats that can be handled by the MFP 100, application/pdf, image/jpeg, and application/highcomppdf in Multipurpose Internet Mail Extensions (MIME) Content-Type, in the information. Then, the MFP 100 returns the information to the smartphone 102.

The file formats application/pdf and image/jpeg are examples of a normal file format. The file format application/highcomppdf is an example of a high-compression file format.

For example, if the operator of the smartphone 102 designates a high-compression PDF file format via the screen and gives a scan start instruction, the smartphone 102 transmits a Create-Job-Request 302 to the MFP 100. In the data of the Create-Job-Request 302, Document Format Accepted:application/highcomppdf is described. The Create-Job-Request is an example of a reading start request.

In step 304 of scanning, the MFP 100 drives the scanner 134 and the ADF 150 to read an image at a resolution of 300 dpi.

The scanner 134 and the ADF 150 can perform high-speed processing. However, if image area separation processing or optical character recognition (OCR) processing, both of which are time-consuming image processing, is performed during the scan, the reading productivity of the scanner decreases, and the scan speed may change depending on an image. Thus, the MFP 100 performs JPEG compression on each packet unit of 64 pixels by 64 pixels of the scanned color image. The JPEG-compressed image is referred to as a packet JPEG and stored in the hard disk 137. In this way, high-speed reading can be realized.

In a case where a GetNextDocumentImage Request 305 is transmitted from the smartphone 102 while the scanner 134 is reading, the MFP 100 returns a GetNextDocumentImage Response 306. In the data of the GetNextDocumentImage Response 306, server-error-busy is described.

In the MFP 100, when the reading by the scanner 134 is completed, the image conversion 307 performs processing to convert an image of a first page stored in packet JPEG file format into an image in high-compression PDF described above with reference to FIGS. 4A and 4B.

When the conversion is completed, the MFP 100 transmits the image of the first page to the smartphone 102 in step 308.

At this timing, the MFP 100 receives a GetNextDocumentImage Request 309 from the smartphone 102.

Then, the MFP 100 returns a GetNextDocumentImage Response 310 to the smartphone 102. In the data of the GetNextDocumentImage Response 310, Last-Document:False is described. The Last-Document:False indicates that there is more data.

In step 311 of image conversion, the MFP 100 performs, on the data of a second page, image conversion similar to that performed on the first page.

When the conversion is completed, the MFP 100 transmits the image of the second page to the smartphone 102 in step 312.

At this timing, the MFP 100 receives a GetNextDocumentImage Request 313 from the smartphone 102.

Then, the MFP 100 returns a GetNextDocumentImage Response 314 to the smartphone 102. In the data of the GetNextDocumentImage Response 314, Last-Document:False is described. The Last-Document:False indicates that there is more data.

In step 315 of image conversion, the MFP 100 performs, on the data of a third page, image conversion similar to that performed on the first page.

When the conversion is completed, the MFP 100 transmits the image of the third page to the smartphone 102 in step 316.

At this timing, the MFP 100 receives a GetNextDocumentImage Request 317 from the smartphone 102.

Then, the MFP 100 returns a GetNextDocumentImage Response 318 to the smartphone 102. In the data of the GetNextDocumentImage Response 318, Last-Document:True is described. The Last-Document:True indicates that the transmission of all the data is completed.

Figure 6:
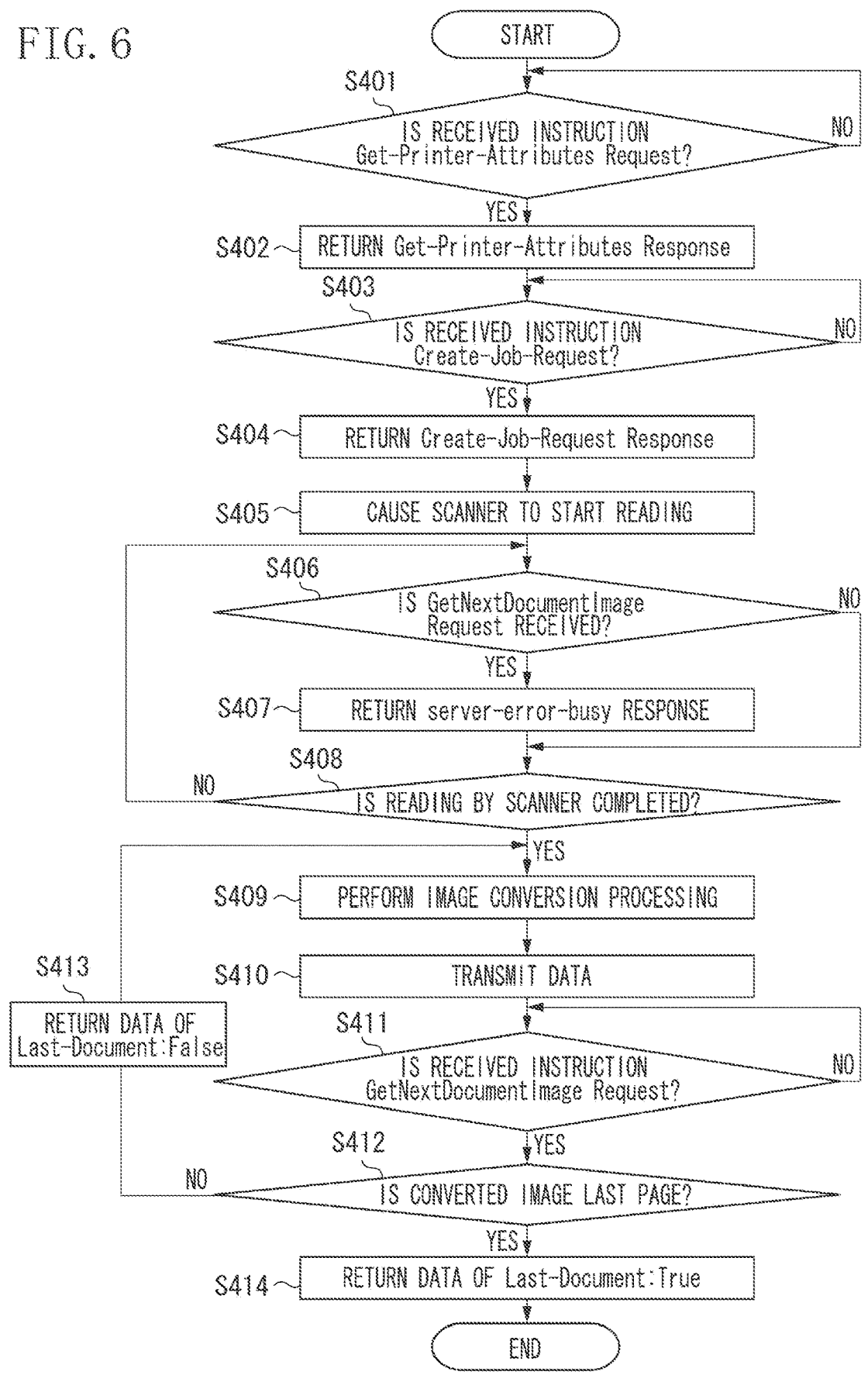
FIG. 6 is a flow chart illustrating an example of pull scan operation.

FIG. 6 is a flow chart illustrating an example of information processing of the pull scan operation to be performed by the MFP 100 described above with reference to FIG. 5.

First, if an instruction is received, then in step S401, the CPU 130 checks whether the instruction is the Get-Printer-Attributes Request 300. If the instruction is not the Get-Printer-Attributes Request 300 (NO in step S401), the CPU 130 waits until a received instruction is the Get-Printer-Attributes Request 300.

On the other hand, if the instruction is the Get-Printer-Attributes Request 300 (YES in step S401), then in step S402, the CPU 130 returns a Get-Printer-Attributes Response.

Next, in step S403, the CPU 130 checks whether an instruction is a Create-Job-Request. If the instruction is not a Create-Job-Request (NO in step S403), the CPU 130 waits until a received instruction is a Create-Job-Request.

On the other hand, if the instruction is a Create-Job-Request (YES in step S403), then in step S404, the CPU 130 returns a Create-Job-Request Response.

In step S405, the CPU 130 causes the scanner 134 to start reading at a resolution of 300 dpi.

In step S406, the CPU 130 checks whether a GetNextDocumentImage Request has been received. If a GetNextDocumentImage Request has been received (YES in step S406), then in step S407, the CPU 130 returns a server-error-busy response.

In step S408, the CPU 130 determines whether the reading by the scanner 134 is completed. If the CPU 130 determines that the reading by the scanner 134 is completed (YES in step S408), the processing proceeds to step S409. On the other hand, if the CPU 130 determines that the reading is not completed (NO in step S408), the processing returns to step S406.

In step S409, the CPU 130 performs image conversion processing. Details of the processing performed in step S409 will be described below with reference to FIG. 7.

In step S410, the CPU 130 transmits the data generated by the conversion to the smartphone 102.

After the image conversion is ended, in step S411, the CPU 130 checks whether a received instruction is a Get-NextDocumentImage Request.

If the received instruction is a GetNextDocumentImage Request (YES in step S411), then in step S412, the CPU 130 checks whether the converted image is the last page.

If the converted image is the last page (YES in step S412), then in step S414, the CPU 130 returns the data of Last-Document:True in the data of GetNextDocumentImage Response, and the flow chart illustrated in FIG. 6 is ended.

On the other hand, if the converted image is not the last page (NO in step S412), then in step S413, the CPU 130 returns the data of Last-Document:False in the data of GetNextDocumentImage Response, and the processing returns to step S409.

Figure 7:
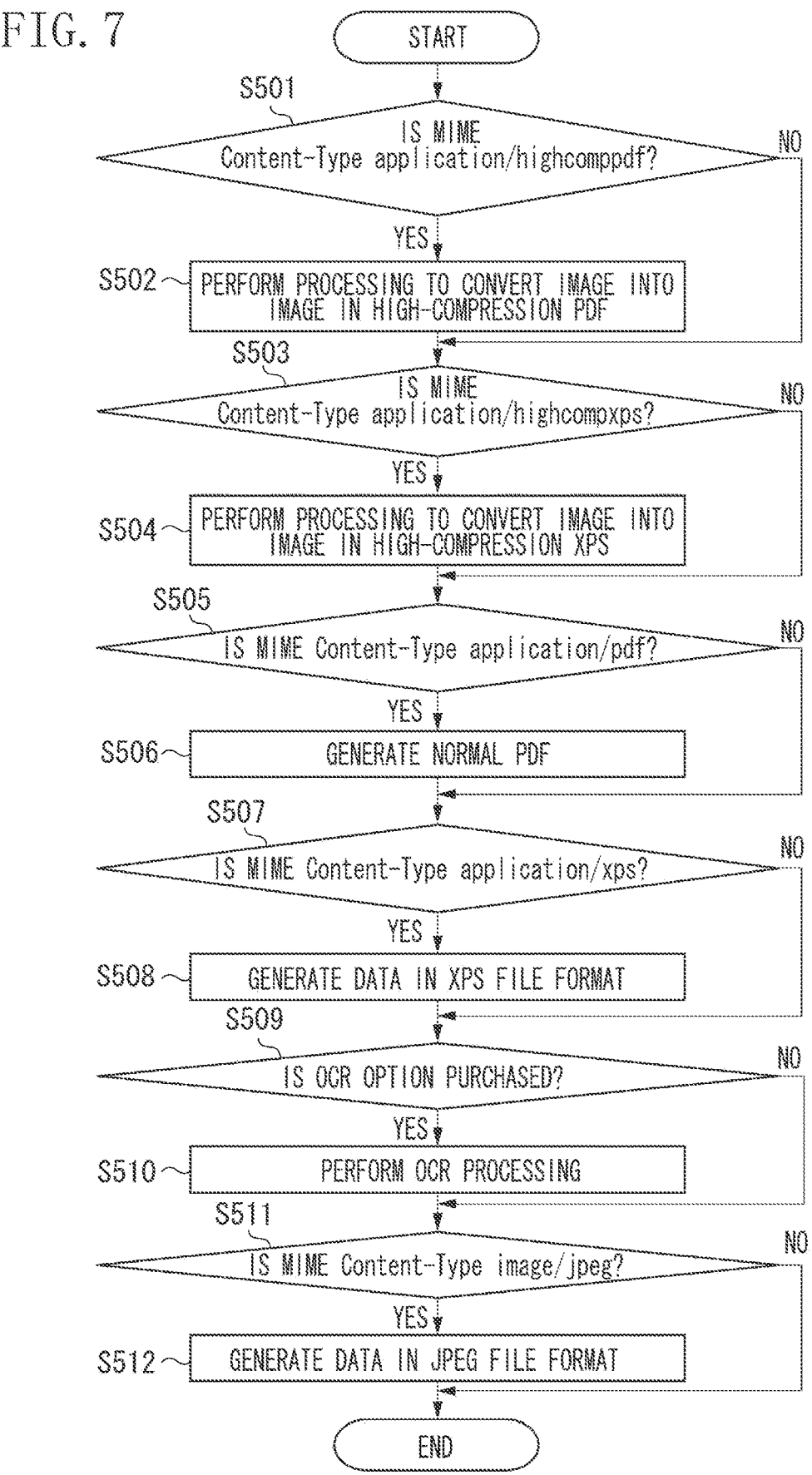
FIG. 7 is a flow chart illustrating an example of image conversion processing performed in step S409.

FIG. 7 is a flow chart illustrating an example of the image conversion processing performed in step S409.

In step S501, the CPU 130 checks whether MIME Content-Type of Document Format Accepted: in the Create-Job-Request 302 is application/highcomppdf. The MIME Content-Type of Document Format Accepted: is an example of the data type.

If MIME Content-Type is application/highcomppdf (YES in step S501), then in step S502, the CPU 130 performs the processing to convert the image into an image in high-compression PDF as described above with reference to FIG. 4B.

In step S503, the CPU 130 checks whether MIME Content-Type of Document Format Accepted: in the Create-Job-Request 302 is application/highcompxps.

If MIME Content-Type is application/highcompxps (YES in step S503), then in step S504, the CPU 130 performs the processing to convert the image into an image in high-compression Extensible Markup Language Paper Specification (XPS), as in the processing to convert the image into an image in high-compression PDF.

In step S505, the CPU 130 checks whether MIME Content-Type of Document Format Accepted: in the Create-Job-Request 302 is application/pdf.

If MIME Content-Type is application/pdf (YES in step S505), then in step S506, the CPU 130 generates a normal PDF file as described above with reference to FIG. 4A.

In step S507, the CPU 130 checks whether MIME Content-Type of Document Format Accepted: in the Create-Job-Request 302 is application/xps.

If MIME Content-Type is application/xps (YES in step S507), then in step S508, the CPU 130 decompresses the scanned packet JPEG image and performs JPEG compression on the entire image to generate data in XPS file format.

An option to perform OCR on a document scanned by the MFP 100 is available for sale. Thus, in step S509, the CPU 130 checks whether the OCR option has been purchased based on, for example, a setting file set in the ROM 131, etc. The OCR processing is an example of optical character recognition processing.

If the OCR option has been purchased (YES in step S509), then in step S510, the CPU 130 performs the OCR processing and performs control to incorporate text data into the PDF or XPS data.

The presence of OCRed text data enables text search and reuse of characters on the smartphone 102.

In step S511, the CPU 130 checks whether MIME Content-Type of Document Format Accepted: in the Create-Job-Request 302 is image/jpeg.

If MIME Content-Type is image/jpeg (YES in step S511), then in step S512, the CPU 130 decompresses the scanned packet JPEG image in FIG. 4A and performs JPEG compression on the entire image to generate data in JPEG file format.

Figure 8:
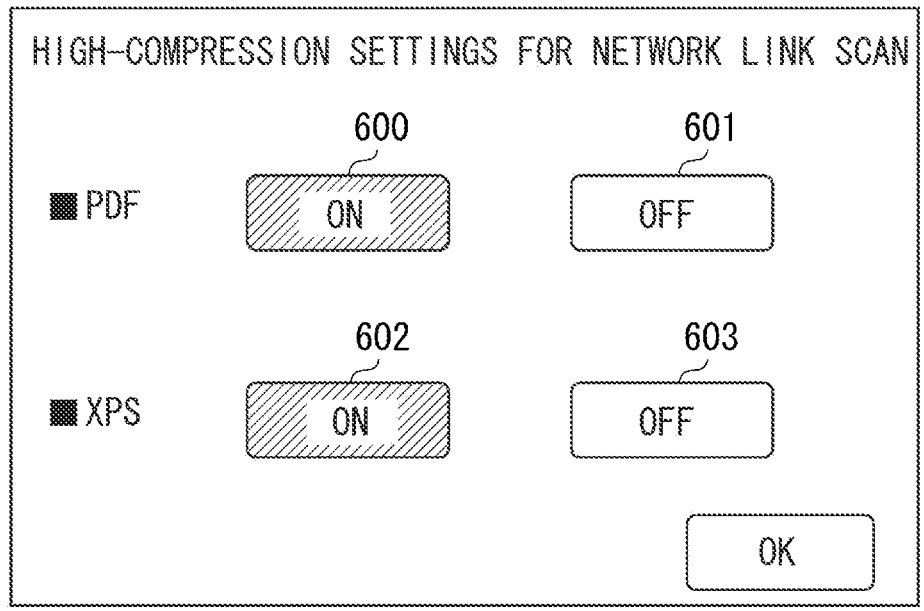
FIG. 8 illustrates an example of a high-compression setting screen.

The following describes a second exemplary embodiment. FIG. 8 illustrates an example of a high-compression setting screen.

In the second exemplary embodiment, processing that is to be performed in a case where application/highcomppdf, etc. for the conversion into high-compression PDF cannot be designated from the smartphone 102 will be described.

The MFP 100 includes a user mode allowing the user to make various types of settings.

If a predetermined operation is performed, the MFP 100 displays on the operation unit 133 a high-compression setting screen for network link scan. An ON button and an OFF button on the high-compression setting screen are exclusive, and the ON button is selected as a default setting. The CPU 130 stores in the hard disk 137, etc. high-compression setting information (high-compression information) about whether which one of the buttons has been selected, in response to a setting operation performed by the user on the high-compression setting screen.

In a case where "PDF" is designated during the scan and an ON button 600 has been selected, the CPU 130 transmits data in high-compression PDF. In a case where "PDF" is designated during the scan and an OFF button 601 has been selected, the CPU 130 transmits data in normal PDF.

In a case where "XPS" is designated during the scan and an ON button 602 has been selected, the CPU 130 transmits data in high-compression XPS. In a case where "XPS" is designated during the scan and an OFF button 603 has been selected, the CPU 130 transmits data in normal XPS.

Figure 9:
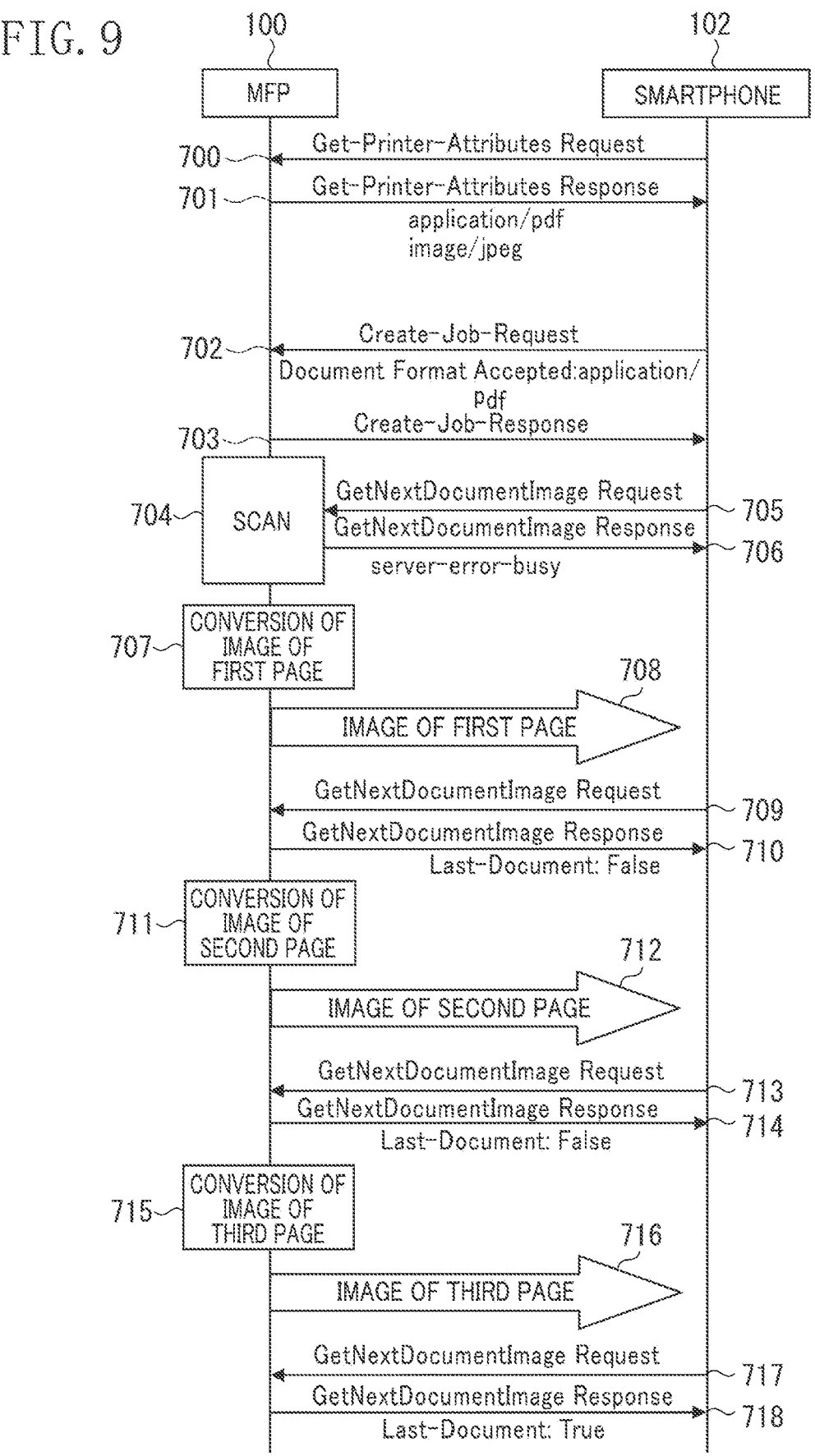
FIG. 9 is a sequence diagram illustrating a pull scan function of a smartphone and an MFP.

FIG. 9 is a sequence diagram illustrating the pull scan function of the smartphone 102 and the MFP 100. FIG. 9 illustrates as an example the case where three pages are scanned.

The user sets documents to be scanned onto the ADF 150 of the MFP 100 and operates the smartphone 102 to give an instruction to start a scan.

First, a Get-Printer-Attributes Request 700 is transmitted from the smartphone 102 to the MFP 100 to inquire about information that can be handled by the MFP 100.

In response to the inquiry, the MFP 100 returns a Get-Printer-Attributes Response 701. The MFP 100 sets as a file format that can be handled by the MFP 100, application/pdf or image/jpeg in MIME Content-Type, in the information. Then, the MFP 100 returns the information to the smartphone 102.

MIME Content-Type corresponds to the file formats of the PDF and JPEG file.

If the PDF file format is designated and an instruction to start a scan is given, the smartphone 102 transmits a CreateJob-Request 702 to the MFP 100. In the data of the CreateJob-Request 702, Document Format Accepted:application/pdf is described.

In step 704 of scanning, the MFP 100 drives the scanner 134 and the ADF 150 to read the image at a resolution of 300 dpi.

The scanner 134 and the ADF 150 can perform high-speed processing. However, if image area separation processing or OCR processing, both of which are time-consuming image processing, is performed during the scan, the reading productivity of the scanner decreases, and the scan speed may change depending on an image. Thus, the MFP 100 performs JPEG compression on each packet unit of 64 pixels by 64 pixels of the scanned color image. The JPEG-compressed image is referred to as a packet JPEG and stored in the hard disk 137. In this way, high-speed reading can be realized.

In a case where a GetNextDocumentImage Request 705 is transmitted from the smartphone 102 while the scanner 134 is reading, the MFP 100 returns a GetNextDocumentImage Response 706. In the data of the GetNextDocumentImage Response 706, server-error-busy is described.

In the MFP 100, when the reading by the scanner 134 is completed, the image conversion 707 performs processing to convert an image of a first page stored in packet JPEG file format into an image in high-compression PDF described above with reference to FIGS. 4A and 4B.

When the conversion is completed, the MFP 100 transmits the image of the first page to the smartphone 102 in step 708.

At this timing, the MFP 100 receives a GetNextDocumentImage Request 709 from the smartphone 102.

Then, the MFP 100 returns a GetNextDocumentImage Response 710 to the smartphone 102. In the data of the GetNextDocumentImage Response 710, Last-Document:False is described. Last-Document:False indicates that there is more data.

In step 711 of image conversion, the MFP 100 performs, on the data of a second page, image conversion similar to that performed on the first page.

When the conversion is completed, the MFP 100 transmits the image of the second page to the smartphone 102 in step 712.

At this timing, the MFP 100 receives a GetNextDocumentImage Request 713 from the smartphone 102.

Then, the MFP 100 returns a GetNextDocumentImage Response 714 to the smartphone 102. In the data of the GetNextDocumentImage Response 714, Last-Document:False is described. Last-Document:False indicates that there is more data.

In step 715 of image conversion, the MFP 100 performs, on the data of a third page, image conversion similar to that performed on the first page.

When the conversion is completed, the MFP 100 transmits the image of the third page to the smartphone 102 in step 716.

At this timing, the MFP 100 receives a GetNextDocumentImage Request 717 from the smartphone 102.

Then, the MFP 100 returns a GetNextDocumentImage Response 718 to the smartphone 102. In the data of the GetNextDocumentImage Response 718, data of Last-Document:True is described to indicate that the transmission of all the data is completed.

Figure 10:
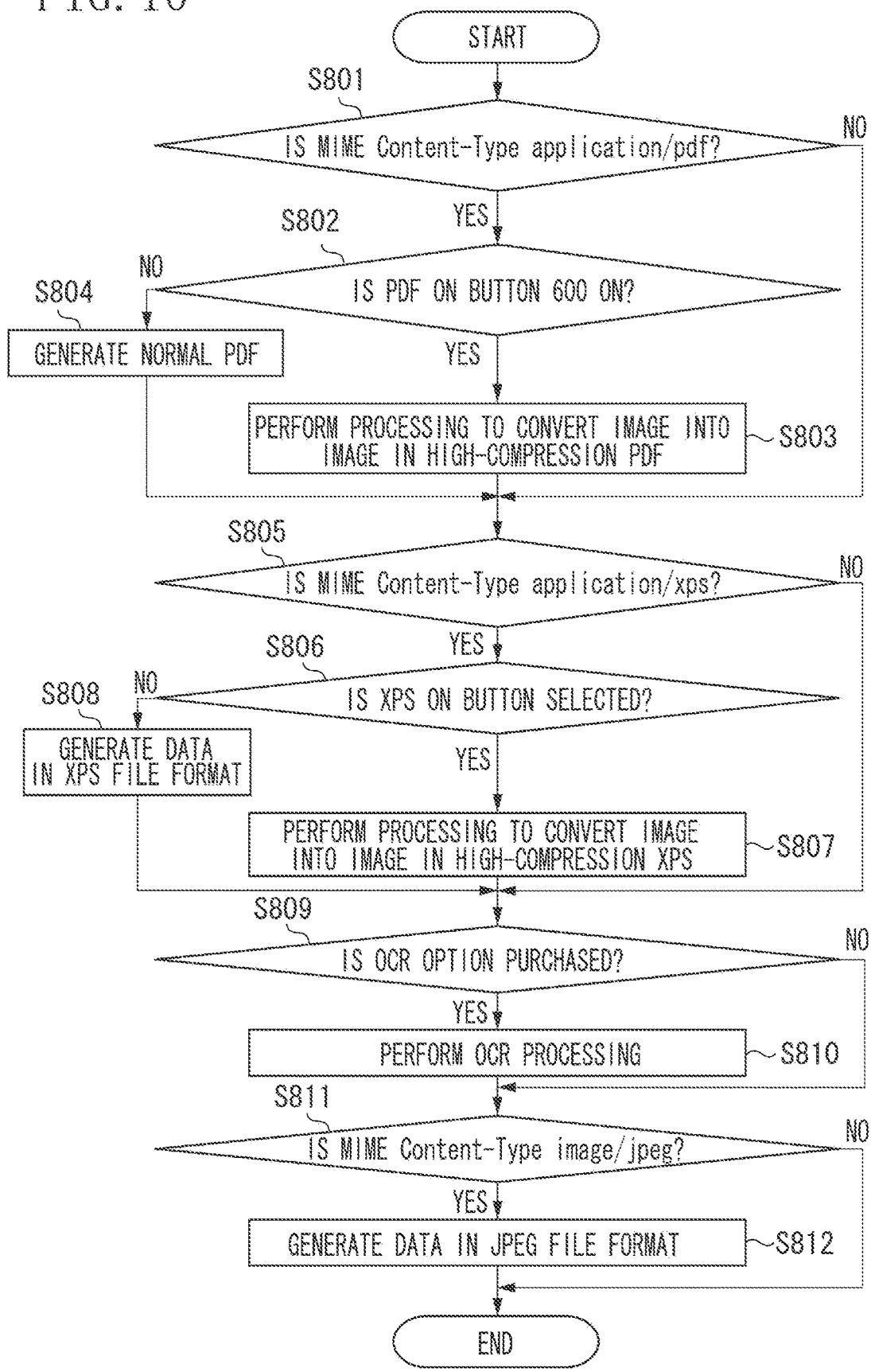
FIG. 10 is a flow chart illustrating an example of image conversion processing according to a second exemplary embodiment.

FIG. 10 is a flow chart illustrating an example of the image conversion processing according to the second exemplary embodiment.

In step S801, the CPU 130 checks whether MIME Content-Type of Document Format Accepted: in the Create-Job-Request 702 is application/pdf.

If MIME Content-Type is application/pdf (YES in step S801), then in step S802, the CPU 130 determines whether the PDF ON button 600 in the user mode has been selected. High-compression setting information about whether, for example, which one of the ON and OFF buttons for PDF has been selected and which one of the ON and OFF buttons for XPS has been selected on the high-compression setting screen in the user mode is stored in the hard disk 137. Based on the high-compression setting information, the CPU 130 determines which one of the buttons has been selected by the corresponding user.

If the PDF ON button 600 is selected (YES in step S802), then in step S803, the CPU 130 performs the processing to convert the image into an image in high-compression PDF as described above with reference to FIG. 4B.

On the other hand, if the PDF OFF button 601 has been selected (NO in step S802), then in step S804, the CPU 130 generates a normal PDF file as described above with reference to FIG. 4A.

In step S805, the CPU 130 checks whether MIME Content-Type of Document Format Accepted: in the Create-Job-Request 702 is application/xps.

If MIME Content-Type is application/xps (YES in step S805), then in step S806, the CPU 130 determines whether the XPS ON button 602 in the user mode has been selected.

If the XPS ON button 602 has been selected (YES in step S806), then in step S807, the CPU 130 performs the processing to convert the image into an image in high-compression XPS, as in the processing to convert the image into an image in high-compression PDF.

On the other hand, if the XPS OFF button 603 has been selected (NO in step S806), then in step S808, the CPU 130 decompresses the scanned packet JPEG image and performs JPEG compression on the entire image to generate data in XPS file format.

In step S809, the CPU 130 checks whether the OCR option has been purchased.

If the OCR option has been purchased (YES in step S809), then in step S810, the CPU 130 performs the OCR processing and performs control to incorporate text data into the PDF or XPS data.

The presence of OCRed text data enables text search and reuse of characters on the smartphone 102.

In step S811, the CPU 130 checks whether MIME Content-Type of Document Format Accepted: in the Create-Job-Request 702 is image/jpeg.

If MIME Content-Type is image/jpeg (YES in step S811), then in step S812, the CPU 130 decompresses the scanned packet JPEG image in FIG. 4A and performs JPEG compression on the entire image to generate data in JPEG file format.

According to each of the foregoing exemplary embodiments, a high-compression file format can be set even in a case where an external device and an image communication apparatus communicate with each other according to a set communication protocol.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-261007, filed Dec. 24, 2014, which is hereby incorporated by reference herein in its entirety.

What is claimed is:

1. An image processing apparatus comprising:
a scanner for scanning a document;
one or more memories storing instructions; and
one or more processors executing the instructions causing the image processing apparatus to:
receive, via a network, an attributes-request from an external device according to standards of the Internet Printing Protocol (IPP);
transmit to the external device, in response to the attributes-request from the external device, a response including a dedicated character string for a second portable document format (PDF) as a file format that can be handled by the image processing apparatus;
receive, via the network, a document scanning request according to the standards of the IPP from the external device, wherein, on a screen used for instructing the document scanning request at the external device that has received the response including the dedicated character string, the second PDF which is identified using the dedicated character string by the external device can be designated by a user as the file format;
control the scanner to scan the document in accordance with the document scanning request;
generate, based on the second PDF being designated as the file format in the received document scanning request, a file in which '.pdf' is set as a file extension, wherein the file is generated by executing image area separation processing on an image of the scanned document and then executing compression processing on the processed image; and
in response to the document scanning request, transmit to the external device the generated file in which '.pdf' is set as the file extension,
wherein, in a portion for setting file extensions in the response transmitted in response to the attributes-request, the dedicated character string is set in place of '.pdf', which is the file extension corresponding to the second PDF,
wherein, for a first PDF which is generated without executing the image area separation processing and the compression processing when the file is generated, 'pdf' is set as a character string corresponding to the first PDF in the portion for setting file extensions in the response transmitted in response to the attributes-request, and
wherein the dedicated character string is a character string which is different from 'pdf' and which enables the external device to identify that the file is a PDF file whose size is compressed.

2. The image processing apparatus according to claim 1, wherein, in the document scanning request, the second PDF is designated by a smartphone as the external device.

3. The image processing apparatus according to claim 1, wherein the second PDF is a high compression PDF.

4. The image processing apparatus according to claim 1, wherein the one or more processors executing the instructions further causes the image processing apparatus to:
determine whether an option for performing optical character recognition (OCR) processing is included; and
perform the OCR processing on the scanned document in a case that the option is included;
wherein the generating the second file includes generating a file in the file format of the second PDF including character data obtained by the performing of OCR processing.

5. A method of controlling an image processing apparatus including a scanner for scanning a document, the method comprising:
receive, via a network, an attributes-request from an external device according to standards of the Internet Printing Protocol (IPP);
transmitting to the external device in response to the attributes-request from the external device, a response including a dedicated character string for a second portable document format (PDF) as a file format that can be handled by the image processing apparatus;
wherein a file to be generated in the file format of the second PDF is smaller than a file to be generated in the file format of the first PDF;
receiving, via the network, a document scanning request according to the standards of the IPP from the external device, wherein, on a screen used for instructing the document scanning request at the external device that has received the response including the dedicated character string, the second PDF which is identified using the dedicated character string by the external device can be designated by a user as the file format;
controlling the scanner to scan the document in accordance with the document scanning request;
generating, based on the second PDF being designated as the file format in the received document scanning request, a file in which '.pdf' is set as a file extension, wherein the file is generated by executing image area separation processing on an image of the scanned document and then executing compression processing on the processed image; and
transmitting, in response to the document scanning request, to the external device the generated file in which '.pdf' is set as the file extension,
wherein, in a portion for setting file extensions in the response transmitted in response to the attributes-request, the dedicated character string is set in place of '.pdf', which is the file extension corresponding to the second PDF, wherein, for a first PDF which is generated without executing the image area separation processing and the compression processing when the file is generated, 'pdf' is set as a character string corresponding to the first PDF in the portion for setting file extensions in the response transmitted in response to the attributes-request, and wherein the dedicated character string is a character string which is different from 'pdf' and which enables the external device to identify that the file is a PDF file whose size is compressed.

6. A non-transitory computer readable storage medium on which is stored a computer program for making a computer execute a method of controlling an image processing apparatus including a scanner for scanning a document, the method comprising:

receive, via a network, an attributes-request from an external device according to standards of the Internet Printing Protocol (IPP);

transmitting to the external device in response to the attributes-request from the external device, a response including a dedicated character string for a second portable document format (PDF) as a file format that can be handled by the image processing apparatus;

wherein a file to be generated in the file format of the second PDF is smaller than a file to be generated in the file format of the first PDF;

receiving, via the network, a document scanning request according to the standards of the IPP from the external device, wherein, on a screen used for instructing the document scanning request at the external device that has received the response including the dedicated character string, the second PDF which is identified using the dedicated character string by the external device can be designated by a user as the file format;

controlling the scanner to scan the document in accordance with the document scanning request;

generate, based on the second PDF being designated as the file format in the received document scanning request, a file in which '.pdf' is set as a file extension, wherein the file is generated by executing image area separation processing on an image of the scanned document and then executing compression processing on the processed image; and in response to the document scanning request, transmit to the external device the generated file in which '.pdf' is set as the file extension, wherein, in a portion for setting file extensions in the response transmitted in response to the attributes-request, the dedicated character string is set in place of '.pdf', which is the file extension corresponding to the second PDF, wherein, for a first PDF which is generated without executing the image area separation processing and the compression processing when the file is generated, 'pdf' is set as a character string corresponding to the first PDF in the portion for setting file extensions in the response transmitted in response to the attributes-request, and wherein the dedicated character string is a character string which is different from 'pdf' and which enables the external device to identify that the file is a PDF file whose size is compressed.

* * * * *